United States Patent
Zhang et al.

(10) Patent No.: US 6,217,999 B1
(45) Date of Patent: Apr. 17, 2001

(54) PHOTOCHEMICAL REACTOR ELEMENT CONTAINING MICROCAPSULATED TITANIUM DIOXIDE PHOTOCATALYST

(75) Inventors: Zuyi Zhang, Kobe; Yoshinori Tanigami, Nishinomiya; Hideo Yamada, Kobe; Hiroyuki Nishino, Akashi, all of (JP)

(73) Assignee: Nihon Yamamura Glass Co., Ltd., Hyogo-ken (JP)

( * ) Notice: Subject to any disclaimer, the term of this patent is extended or adjusted under 35 U.S.C. 154(b) by 0 days.

(21) Appl. No.: 09/222,299

(22) Filed: Dec. 28, 1998

(30) Foreign Application Priority Data

Dec. 26, 1997  (JP) ...................................................... 9-368384

(51) Int. Cl.$^7$ ................................ B01J 23/00; B32B 5/16
(52) U.S. Cl. .................................. 428/312.6; 427/213.34; 427/213.36; 428/317.9; 428/328; 428/403; 430/138; 502/350; 502/439
(58) Field of Search ..................................... 502/350, 439; 428/317.9, 328, 403, 312.6; 427/213.34, 213.36; 430/138

(56) References Cited

U.S. PATENT DOCUMENTS

| | | |
|---|---|---|
| 5,616,532 | 4/1997 | Heller et al. . |
| 5,643,592 * | 7/1997 | Jacobson et al. ..................... 424/409 |
| 5,849,200 | 12/1998 | Heller et al. . |
| 5,854,169 | 12/1998 | Heller et al. . |
| 6,013,372 * | 1/2000 | Hayakawa et al. ............... 428/411.1 |

OTHER PUBLICATIONS

English Abstract of JP 10–5598 A, Jan. 1998*

English Abstract of JP 9–31335 A, Feb. 1997*

* cited by examiner

Primary Examiner—Blaine Copenheaver
(74) Attorney, Agent, or Firm—Millen White Zelano & Branigan

(57) ABSTRACT

A photochemical reactor element containing microcapsulated $TiO_2$ photocatalyst particles dispersed in a polysiloxane matrix is disclosed. The polysiloxane matrix has an oxygen gas permeability not less than $1\times10^{-14}$ mol·m·m$^{-2}$·s$^{-1}$·Pa$^{-1}$. The photochemical reactor element is produced by dispersing the microcapsulated or naked $TiO_2$ photocatalyst particles in a hydrolyzate-polycondensate sol of a trialkoxysilane or a mixture thereof with a tetra- and/or dialkoxysilane and then shaping the dispersion into the element. The naked $TiO_2$ photocatalyst particles in the element are microcapsulated within a porous silica shell layer in situ by irradiating the element with UV radiation.

22 Claims, No Drawings

PHOTOCHEMICAL REACTOR ELEMENT CONTAINING MICROCAPSULATED TITANIUM DIOXIDE PHOTOCATALYST

BACKGROUND OF THE INVENTION

This invention relates to a photochemical reactor element containing microcapsulated $TiO_2$ photocatalyst.

Titanium dioxide has long been used as a white pigment. It is known that intact $TiO_2$ crystals or particles have a strong photocatalytic activity and, therefore, may cause photochemical degradation of paint films known as "chalking" when the $TiO_2$-containing films are exposed to sunshine in the presence of oxygen and water. Consequently, almost all commercial $TiO_2$ pigments have been coated with one or more dense layers of $SiO_2$, $Al_2O_3$, $ZrO_2$ or other metal oxides to retard the photochemical degradation of the paint film.

The $TiO_2$ photocatalyst finds unique use, instead, in photochemically decomposing or destroying malodorous substances, air pollutants or microorganisms. $TiO_2$ photocatalyst may also be used in producing superhydrophilic surfaces on a substrate which are hardly susceptible to soiling. See, WO96/29375 published Sep. 26, 1996. In these applications, the $TiO_2$ photocatalyst occurring as powder not only needs to be immobilized on a substrate but also needs to be exposed at least in part to the atmosphere and light. It is also necessary for a matrix or binder used to immobilize the $TiO_2$ particles to be hardly susceptible to $TiO_2$ catalyzed photochemical reactions.

Several attempts have been made to meet these conditions. JP-A-05253544 discloses a method of forming a $TiO_2$ photocatalyst layer on a ceramic substrate such as building tiles by applying titania sol onto the glaze layer of the tile before melting the glaze layer, and then firing both layers. WO96/29375 discloses a similar method comprising applying a mixture of $TiO_2$ sol and $SiO_2$ sol onto the surface of a heat resistant substrate to form a film and then firing the film. This method is used to form a superhydrophilic coating on ceramic or glass substrates such as building tiles, mirrors or glass lenses. The above two methods suffer from disadvantages that the substrate is limited to ceramics, glass or other fire-resistant materials and that the photocatalyst layer is frangible and susceptible to abrasive wear. JP-A-08067835 and JP-A-08141503 disclose the use of an inorganic binder material to immobilize the photocatalyst particles, while WO96/29375, discloses silicone polymers as a binder or matrix of $TiO_2$ photocatalyst particles to form photoreactive films on a substrate. Although films formed of silica or silicone polymers are less susceptible to the photochemical degradation than organic binder resins conventionally used in the paint industry, only a portion of the photocatalyst particles that are exposed to the atmosphere can participate in the photochemical reaction and the remainder of particles that have been fully embedded in the matrix body are not available to the photochemical reaction.

JP-A-08131842 discloses a photochemically active coating film formed of a thermoplastic or thermosetting resin. To expose the photocatalyst particles adjacent to the surface, the film is irradiated with UV light to photochemically decompose the matrix resin surrounding the photocatalyst particles. Obviously, this treatment is intentional "chalking" which remarkably impairs the film integrity.

JP-A09031335 and JP-A-10005598 disclose $TiO_2$ photocatalyst particles having a porous coating of photochemically inert inorganic materials. The porous coating layer prevents direct contact of the photocatalyst particles with the surrounding matrix and, therefore, may decrease the photochemical degradation of matrix. This treatment compromises the photocatalytic activity of $TiO_2$ particles as in the case of conventional $TiO_2$ pigments. However, the photochemical degradation of matrix is not fully avoidable when used at a concentration sufficient to exhibit a desired photocatalytic activity.

All of the above-discussed prior art commonly suffer from disadvantages associated with the fact that only a portion of the photocatalyst particles that are exposed to the atmosphere can participate in the photochemical reaction and the reminder is not available to the photochemical reaction.

A need exists, therefore, for a $TiO_2$ photocatalyst composition and a system which may elimate or ameliorate various problems associated with the above-discussed prior art.

SUMMARY OF THE INVENTION

In one aspect, the present invention provides a photochemical reactor element using $TiO_2$ photocatalyst particles. According to the present invention, the photochemical reactor element comprises a composition containing microcapsulated $TiO_2$ photocatalyst particles having a porous shell layer of photochemically inert inorganic material, said microcapsulated $TiO_2$ photocatalyst particles being dispersed in a polysiloxane matrix having a permeability to oxygen gas not less than $1 \times 10^{-14}$ mol·m·m$^{-2}$·s$^{-1}$·Pa$^{-1}$. The polysiloxane matrix is preferably formed of a three-dimensional polysiloxane network comprised of a recurring unit of the formula: $RnSiO_{(4-n)/2}$ wherein R is methyl, ethyl, n-propyl, isopropyl, phenyl or vinyl, and n is a number represented by the equation $0<n \leq 1.7$.

The photochemical reactor element of the present invention may take any desired shape such as coating films, self-sustained films, bulk bodies, filaments or other shaped bodies.

In another aspect, the present invention provides a method for preparing the photochemical reactor element of the present invention. The method comprises providing microcapsulated $TiO_2$ photocatalyst particles having a porous shell layer of a photochemically inert inorganic material, providing a hydrolyzate-polycondensate sol of a trialkaoxysilane of the formula $RSi(OR')_3$ wherein R is methyl, ethyl, n-propyl, isopropyl, phenyl or vinyl, and R' is methyl or ethyl, or a mixture of said trialkoxysilane with a tetraalkoxysilane of the formula $Si(OR')_4$ and/or a dialkoxysilane of the formula $R_2Si(OR')_2$ wherein R and R' are as defined, dispersing an amount of said microcapsulated $TiO_2$ photocatalyst particles in said sol, and shaping and converting the mixture into the photochemical reactor element. Alternatively, the microcapsulated $TiO_2$ photocatalyst particles may be produced in situ in the matrix using naked $TiO_2$ photocatalyst particles. In this case, the above method is followed using naked $TiO_2$ photocatalyst particles. The in situ microcapsulation step comprises irradiating the shaped element with light having an energy greater than the band gap of $TiO_2$ photocatalyst at a dose sufficient to decompose the hydrocarbon groups of surrounding matrix in the vicinity of the $TiO_2$ particles while retaining the polysiloxane network of the matrix.

It will be appreciated that the present invention achieves significant advantages over the prior art. Microcapsulation of $TiO_2$ photocatalyst particles within a porous shell layer of photochemically inert inorganic material and the use of a polysiloxane material having a high permeability to oxygen gas as matrix contribute, on one hand, to decreased susceptibility to photochemical degradation of the matrix and, on the other hand, to the availability of the entire photocatalyst particles including fully embedded particles to the photochemical reaction.

Other advantages of the present invention will become apparent as the description proceeds.

DESCRIPTION OF THE PREFERRED EMBODIMENTS $TiO_2$ particles used as pigment normally have a particle size from about 0.2 to about 0.3 $\mu$m, while $TiO_2$ photocatalyst particles have much smaller particle size and thus much greater specific surface areas than the $TiO_2$ pigment.

The $TiO_2$ photocatalyst particles have a primary particle size less than 100 nm, normally several tens nm or less in average. The crystalline form thereof is normally anatase which is photochemically more active than rutile as is well-known in the pigment industry. The $TiO_2$ based photocatalyst is commercially available, for example, under the brand name of TAIPEK™ ST-01, ST-11, ST-21 or ST-31 from Ishihara Sangyo Kaisha, Ltd. Any of these commercial products and the corresponding products from other sources may be used in the present invention.

The microcapsulation of the photocatalyst particles may be performed as an independent step. As materials of the porous shell layer, $SiO_2$, $Al_2O_3$, $ZrO_2$ or other metal oxides are preferable provided they form a porous shell layer which does not fracture upon handling. The microcapsulation of the photocatalyst particles with a photochemically inert material may be carried out similar to the method for microcapsulating the $TiO_2$ photocatalyst together with an inorganic deodorizing agent as disclosed in JP-A-09031335. Alternatively, the microcapsulation may be carried out by the method as taught in JP-A-10005598. The disclosures of these references are incorporated herein by reference. It is important for the porous shell layer to have a number of micropores of at least 5 angstrom, preferably from 10 to 300 angstrom in size to keep free access of molecules to be destroyed to the photocatalyst.

The microcapsulated $TiO_2$ photocatalyst particles are immobilized using a polysiloxane matrix having a permeability to oxygen gas not less than $1 \times 10^{-14}$, preferably not less than $2 \times 10^{-14}$ mol·m·m$^{-2}$·s$^{-1}$·Pa$^{-1}$. The polysiloxane matrix meeting this requirement includes but not limited to the methyl-modified silica gel produced by the method disclosed in U.S. patent application Ser. No. 08/703,704, issued as U.S. Pat. No. 5,858,280 on Jan. 12, 1999, and assigned to the assignee of this application, the entire disclosure of which is incorporated herein by reference. The gel basically consists of a polymer in which a number of $CH_3SiO_{3/2}$ units are recurring forming a three dimensional structure. The gas permeabilities of $N_2$ and $O_2$ through $CH_3SiO_{3/2}$ films produced by the above method are comparable to or greater than those of the majority of organic polymer films. Further investigation revealed that the $CH_3SiO_{3/2}$ gel showed a broad diffraction peak in X-ray diffraction that corresponds to an inter-polysiloxane main chain distance from about 8.6 to 8.9 angrotrom, whereas no corresponding peak was present in the X-ray diffraction curve of silica gel produced from the hydrolysis and polycondensation of tetraalkoxysilanes. See, Z. Zhang et al., Proc. of 18th International Conference on Glasses and Z. Zhang et al., Journal of Sol-Gel Science and Technology, 12:153–158 (1998). It is assumed, therefore, that interstices present between adjacent polysiloxane main chains corresponding to the broad diffraction peak at around 10 degree (2θ, CuKα) contribute to the gas permeability of the $CH_3SiO_{3/2}$ gel. The gas permeability of polysiloxane matrix generally increases with the inter-main chain distance. Thus, it is preferable for the polysiloxane matrix to have an inter-main chain distance of at least 8.60 angstrom, more preferably at least 8.85 angstrom to exhibit an oxygen gas permeability of at least $1 \times 10^{-14}$ and at least $2 \times 10^{-14}$ mol·m·m$^2$·s$^{-1}$·Pa$^{-1}$ respectively.

The present invention utilizes such a unique property of the polysiloxane gel and uses the gel as a matrix of the microcapsulated $TiO_2$ photocatalyst. It is well-known that when exciting $TiO_2$ by the irradiation with light having an energy greater than the band gap of $TiO_2$ in the presence of water and oxygen, hydroxyl and superoxide free radicals are generated. It is these free radicals that oxidize and decompose various substances. The use of gas permeable polysiloxane material as a matrix of microcapsulated $TiO_2$ photocatalyst allows a series of the above photochemical reactions to take place not only in the vicinity of $TiO_2$ photocatalyst particles that are exposed to the atmosphere but also in the vicinity of fully embedded $TiO_2$ particles.

Although the $CH_3SiO_{3/2}$ gel prepared by the method disclosed in the above cited U.S. patent application Ser. No. 08/703,704, issued as U.S. Pat. No. 5,858,280 on Jan. 12, 1999, is preferable, other polysiloxane materials having a three-dimensional or ladder structure may also be used as the matrix provided they have a permeability to oxygen gas not less than $1 \times 10^{-14}$ mol·m·m$^{-2}$·s$^{-1}$·Pa$^{-1}$. Broadly speaking, the material is formed of an organopolysiloxane of a recurring unit of the formula: $RnSiO_{(4-n)/2}$ wherein R is methyl, ethyl, n-propyl, isopropyl, phenyl or vinyl, and 0<n≦1.7. The matrix material may be produced by the same or similar method as disclosed in the above-cited U.S. Patent Application starting from a trialkoxysilane alone or a mixture thereof with a di- and/or tetraalkoxysilane.

Examples of usable trialkoxysilanes include methyltrimethoxysilane (MTMS), methyltriethoxysilane (MTES), ethyltrimethoxysilane (ETMS), n-propyltrimethoxysilane, isopropyltrimethoxysilane, phenyltriethoxysilane(PhTES) or vinyltriethoxysilane(VTES). MTES is preferable. Mixtures of trialkoxysilanes with di- and/or tetraalkoxysilanes may be used. Examples of dialkoxysilanes include dimethyldiethoxysilane (DMDE) or diphenyldimethoxysilane (DPhDM). Examples of tetraalkoxysilanes include tetraethoxysilane (TEOS) or tetramethoxysilane (TMOS). When mixtures are used, the molar ratio of total number of hydrocarbon groups to silicon atom (n) in the mixture should be in a range 0<n≦1.7. In order to balance various mechanical properties of the resulting polysiloxane matrix, n is preferably 0.2≦n≦1.6, more preferably 0.8≦n≦1.2.

The matrix material is produced by hydrolyzing and polycondensing the starting alkoxysilane monomer. The hydrolysis and polycondensation (hereinafter simply "hydrolysis") reaction is performed by adding an amount of water to the starting material. The reaction takes place at an acidic or neutral pH. It is preferable to conduct the reaction at an initial pH from 1 to 7 and more preferably from 1 to 5. To this end, an acid such as nitric, hydrochloric, acetic or other inorganic or organic acid is added to water to promote the reaction. The amount of water relative to the starting alkoxysilane may be represented by the $H_2O/Si$ molar ratio. This molar ratio to achieve complete hydrolysis is 1.5 in theory for trialkoxysilanes (4−n=3), 1.0 for dialkoxysilanes (4−n=2) or 2 for tetraalkoxysilane (4−n=0). Thus, the $H_2O/Si$ molar ratio should be at least (4−n)/2 to produce $RnSiO_{(4-n)/2}$ polysiloxane. It is decided empirically that the $H_2O/Si$ molar ratio generally ranges between 1.4 and 4.0. Preferably the H$_2$O/Si molar ratio is between 1.4 and 2.5 when the starting alkoxysilane monomer consists solely of trialkoxysilane or contains 50 or more mole % of a trialkoxysilane. Alcohols are produced as by-product during the reaction and may be removed by placing the reaction mixture in an open system or by evaporation.

As taught in the cited application, it is advantageous to add a catalytically effective amount of a soluble metal complex to the starting monomer composition containing methyltrialkoxysilane to suppress the formation of crystalline hydrolyzate. Examples of soluble metal complexes found to be effective for this purpose include β-diketone chelates such as tris(acetylacetonato)aluminum (III), tris (ethylacetoacetato)aluminum (III), tris(diethylmalonato) aluminum (III), bis(acetylacetonato)copper (II), tetrakis (acetylacetonato)zirconium (IV), tris(acetylacetonato) chromium (III), tris(acetylacetonato)cobalt (III), titanium (II) oxyacetylacetonate of the formula: $(CH_3COCHCOCH_3)_2TiO$ or corresponding β-diketone complexes of rare earth metals; or crown ether metal complexes such as 18-crown-6 potassium complex, 12-crown-4 lithium complex or 15-crown-5 sodium complex. The metal complex is added in an amount generally from 0.001 to 5 mole %, preferably from 0.01 to 1 mole % relative to the methyltrialkoxysilane. When the starting alkoxysilane composition comprises a substantial proportion of a tetraalkoxysilane ($0 \leq n \leq 1.0$), it is advantageous to add an alkanol such as methanol or ethanol to make a uniform sol. The presence of the soluble metal complex in the reaction system is effective to regulate the hydrolysis and polycondensation reaction of alkoxysilane monomer so that linear or ladder structure polymers are formed in the initial stage of the reaction without forming crystalline precipitates in the sol. This results in not only increased transparency of the polysiloxane matrix but also spacing apart adjacent polysiloxane main chains to increase the oxygen gas permeability.

Additives including the microcapsulated or naked TiO$_2$ particles are added to the resulting hydrolyzate sol. The TiO$_2$ photocatalyst is present in a proportion generally from 0.1 to 15% and preferably from 0.5 to 10% by weight as TiO$_2$ of the composition forming the photochemical reactor element of the present invention. Optional additives other than the TiO$_2$ photocatalyst include silica sol, alumina sol or zirconia sol. The addition of a metal oxide sol of this type in an amount no greater than 50% by weight as solids is often effective to improve the mechanical property of the matrix. If desired, an adsorbent for gaseous malodorous substances or air pollutants may be added to the sol before gelling. Examples thereof include zeolite (hydrophilic or hydrophobic), activated clay, acid clay, hydrotalcite, sepiolite, silica-alumina, silica-magnesia, or a combination thereof. The absorbent material may be microencapsulated together with the TiO$_2$ photocatalyst.

The photochemical reactor element may take any desired shape such as coating films, self-sustained films, bulk bodies, fiber or filaments. Coating films may be produced on inorganic substrates such as glass, ceramic or metal substrates; or organic substrates such as acrylic resins, polyurethane resins or polyester resins; or natural substrates such as wood or paper by applying the hydrolyzate sol using a conventional application method such as spraying, dipping or roller coating.

Self-sustained films may be produced by developing the hydrolyzate sol onto a supporting aqueous solution in which the sol is not soluble, or by casting the sol on a nonadherent substrate to form a film following by stripping the film from the substrate after gelation. Usable nonadherent substrates are made of a polymeric material having a low affinity with silanol group and include polyethylene, polypropylene, polystyrene, polytetrafluoroethylene, silicone or polyvinyl chloride sheets, laminates having a surface layer made of these nonadherent polymeric materials. The thickness of self-sustained films may be controlled as desired by the conventional method using an air knife, bar coater, doctor blade, metering roll, doctor roll or the like. Films having a thickness from 20 to 200 μm may be produced by this method.

Bulk bodies may be produced by casting the hydrolyzate sol into a mold made of or lined with the above-mentioned nonadhering material. Bulk bodies having a complicated shape may be produced with the use of a pair of mold halves.

Fibers or filaments may be produced from the hydrolyzate sol having a suitable viscosity using conventional methods.

Gelation or curing of the hydrolyzate sol takes place as the solvent and/or by-product alcohol evaporates from the sol. During this period, further condensation reaction takes place between remaining silanol and alkoxy groups. It was found that various properties of the resulting gel including the oxygen gas permeability, weatherability, anti-chalking property and mechanical strength may further be improved by subjecting to a heat treatment. The heat treatment may be conducted preferably in the presence of a vaporized base such as ammonia, methylamine, ethylamine, dimethylamine, trimethylamine, ethanolamine, diethanolamine or triethanolamine. Ammonia gas is recommended for economical reasons. The use of vaporized base is effective to accelerate the polycondensation reaction of residual silanol groups resulting in the reduction of treating temperature or reaction time or improving the quality of polycondensate. The treating temperature is chose from room temperature to 300° C. depending upon the nature of substrates used.

As stated earlier, naked TiO$_2$ photocatalyst particles may be microcapsulated in the matrix in situ. To this end, the shaped element is irradiate with light having an energy greater than the band gap of TiO$_2$ photocatalyst for a time sufficient to decompose the hydrocarbon groups of surrounding matrix in the vicinity of the TiO$_2$ particles while retaining the polysiloxane network. The irradiation step may be carried out either prior to or subsequent to the heat treatment step. It is preferable that the intensity of the light (UV radiation) be as low as from 2 to 10 mW/cm$^2$ so as to avoid excessive damages to the matrix. This in situ microcapsulation of TiO$_2$ photocatalyst allows a porous silica shell layer to be formed around each TiO$_2$ particle without affecting the mechanical strength of the shaped element.

EXAMPLES

The following examples are offered for illustrative purposes only not for limitative purpose.

Example 1

Methyltriethoxysilane (MTES) sold by Shin-Etsu Chemical Co., Ltd. with a code name of LS-1890 was used as the starting material. To this was added an amount of 0.01M aqueous nitric acid solution at an MTES/H$_2$O molar ratio of 1/1.25. The mixture was stirred at room temperature for 2 days in a closed vessel. Then 80% in theory of ethanol produced as a reaction by-product was removed using a rotary evaporator to obtain an oligomer solution. To the oligomer solution were added 0.1 mole % of MTES of tris(acetylacetonato)aluminum (III) and 0.5 mole/mole of METS of distilled water. The mixture was stirred at 50° C. for 30 minutes in a closed vessel to make a clear solution followed by standing at 40° C. for 10 hours. To 100 g of the resulting solution was added 3 g of TiO$_2$ photocatalyst sold by Ishihara Sangyo Kaisha, Ltd. under the name of TAI-PEK™ ST-01. The mixture was well dispersed using a homogenizer and then allowed to stand until a viscosity level suitable for application was reached. The dispersion was then applied on a polyester sheet having a silicone nonadherent coating using a doctor blade coater, and air-dried at 150° C. for one hour. After stripping off from the polyester sheet, a self-sustained CH$_3$SiO$_{3/2}$ film containing 5 wt. % of the photocatalyst and having a thickness of about 50 μm was obtained. The oxygen gas permeability measured on the corresponding CH$_3$SiO$_{3/2}$ film free from the photocatalyst was $2\times10^{-14}$ mol·m·m$^{-2}$·s$^{-1}$·Pa$^{-1}$. The inter-main chain distance calculated from the broad XRD peak position was 8.90 angstrom.

The self-sustained film thus produced was irradiated with UV radiation of 365 nm wavelength at an intensity of 6 mW/cm$^2$ for 3 hours to microcapsulate the TiO$_2$ photocatalyst particles with a porous silica layer in situ.

The resulting self-sustained film was cut into pieces of 40×70 mm size and each cut piece was sealingly placed in each of two 4 litter pyrex glass bottles. Then 5 μL of acetaldehyde was injected into each bottle using a microsyringe. The initial acetaldehyde concentration in the gas phase determined with an acetaldehyde gas detector tube (Gastech) was 475 ppm. The control bottle kept in the dark for 42 hours showed almost no change from the initial acetaldehyde concentration. The other bottle was irradiated with UV radiation of 365 nm at an intensity of 4.5 mW/cm$^2$ and showed a decreasing acetaldehyde concentration with time. The concentration decreased to 200 ppm after the irradiation for 42 hours. The self-sustained film showed a satisfactory weatherability in the standard accelerated weathering test for 1,000 hours at 40° C.

Example 2

Cut pieces of the film prepared in Example 1 were sealingly placed in two 4 liter pyrex glass bottles one piece/bottle. Then 12 μL of 28 wt. % aqueous ammonia was injected into each bottle using a microsyringe. The initial ammonia concentration in the gas phase determined with an ammonia gas detector tube (Gastech) was 720 ppm. The control bottle placed in the dark showed an ammonia concentration of 150 ppm after 48 hours. The other bottle irradiated with UV radiation of 365 nm wavelength at an intensity of 4.5 mW/cm$^2$ for 48 hours showed an ammonia concentration of 20 ppm.

Example 3

Cut pieces of the film prepared in Example 1 were sealingly placed in two 4 liter pyrex glass bottles, one piece/bottle. Then 7 μL of 3.5 wt. % aqueous acetic acid solution was injected into each bottle using a microsyringe. The initial acetic acid concentration in the gas phase determined with an acetic acid detector tube (Gastech) was 45 ppm. The control bottle placed in the dark showed an acetic acid concentration of 30 ppm after 48 hours. The test sample irradiated with UV radiation of 365 nm wavelength at an intensity of 4.5 mw/cm$^2$ showed no detectable level of acetic acid after irradiating for 48 hours.

Example 4

A 1:1 mixture of MTES and phenyltriethoxysilane (PhTES) sold by Shin-Etsu Chemical Co., Ltd. with a code name of LS-4480 was used as the starting material. To this were added 0.1 moles % of MTES of tris(acetylacetonato) aluminum (III) and an amount of aqueous nitric acid solution as used in Example 1 at a H$_2$O/Si molar ratio of 2. The mixture was stirred at room temperature for 2 days in a closed vessel to obtain a clear solution. To 100 g of the solution was dispersed 3 g of TiO$_2$ photocatalyst TAIPET™ ST-01 using a homogenizer to obtain a coating liquid. This coating liquid was sprayed on a glass substrate and acrylic substrate respectively, and then dried at 80° C. to form a coating film having a thickness of about 10 μm. The TiO$_2$ content in the film was 6% by weight. Then each film was irradiated with UV radiation of 365 nm wavelength at an intensity of 6 mW/cm$^2$ for 3 hours as in Example 1. The oxygen gas permeability determined on the corresponding self-sustained film of about 40 μm thickness free from the TiO$_2$ photocatalyst was $1.5\times10^{-14}$·mol·m·m$^{-2}$·s$^{-1}$·Pa$^{-1}$. The inter-main chain distance calculated from the very broad XRD peak position was about 10.45 angstrom.

Each coating film was cut in pieces of 40×70 mm size with the substrate. Pairs of cut pieces having the same substrate were separately placed two pieces/bottle in a pair of the same glass bottles as used in Example 1. Then 5 μL of acetaldehyde was injected into each bottle using a microsyringe. The initial acetaldehyde concentration in the gas phase determined with an acetaldehyde detector tube (Gastech) was 465 ppm. Control bottles kept in the dark for 48 hours showed almost no change from the initial acetaldehyde concentration for both films formed on different substrates. The other bottle of each test series was irradiated with UV radiation of 365 nm wavelength at an intensity of 4.5 mW/cm$^2$ and showed a decreasing acetaldehyde concentration with irradiation time. The concentration decreased to 230 ppm for the glass substrate and 200 ppm for the acrylic substrate, respectively after the irradiation time of 48 hours.

Example 5

Microcapsulated TiO$_2$ photocatalyst was prepared as follows. 3.6 parts by weight of TAIPEK™ ST-01 and 6.4 parts by weight as SiO$_2$ of SNOWTEX™ S (silica sol sold by Nissan Chemical Industries, Ltd.) were taken in a potmill. The mixture was stirred at 100 rpm for 1 hour, spray dried and then calcined at 400° C. for 1 hour to obtain microcapsulated TiO$_2$ photocatalyst particles having a porous silica coating layer.

A MTES hydrolyzate oligomer solution was prepared as in Example 1. Separately, a tetraethoxysilane (TEOS) hydrolyzate oligomer solution was prepared by stirring a mixture of TEOS, ethanol and water at a molar ratio of 1:2:1.5 in a closed vessel at room temperature for 2 days. Water used in this reaction was the aqueous nitric acid solution used in Example 1. Thereafter, the two oligomer solutions were mixed at a MTES:TEOS molar ratio of 1:1 and the mixture was stirred in a closed vessel at room temperature for 30 minutes. After adding an equimolar amount of water relative to TEOS, the mixture was stirred again in a closed vessel at room temperature for 5 hours to obtain a clear solution.

100 g of this solution was mixed with 4 g of the microcapsulated TiO$_2$ photocatalyst prepared as above using a homogenizer to obtain a coating solution. The resulting coating solution was sprayed onto a glass substrate and dried at 140° C. to form a coating film of a thickness of about 10 μm and containing 5 wt. % of the photocatalyst as TiO$_2$. The oxygen gas permeability determined on the corresponding self-sustained film of about 100 μm thickness free from the photocatalyst was $4\times10^{-14}$ mole m·m·m$^{-2}$·s$^{-1}$·Pa$^{-1}$. The inter-main chain distance calculated as in the preceding Examples was 8.92 angstrom.

Cut pierces of 40×70 mm size were placed in two 4 liter pyrex glass bottles, two pieces/bottle and tested for deodorizing performance as in Example 4. The initial acetaldehyde concentration was 455 ppm. This concentration decreased to 170 ppm for one bottle irradiated with UV radiation for 48 hours, whereas the acetaldehyde concentration remained almost unchanged for the control bottle kept in the dark.

Example 6

Example 5 was repeated to obtain a coating film of about 12 μm containing microcapsulated $TiO_2$ photocatalyst particles of 3.3 wt. % as $TiO_2$ except that the MTES hydrolysate oligomer solution and the TEOS hydrolysate oligomer solution were mixed at a MTES:TEOS molar ratio of 1:0.2. The oxygen gas permeability of the corresponding self-sustained film of about 80 μm thickness free from $TiO_2$ photocatalyst was $2.5 \times 10^{-14}$ mol·m·m$^{-2}$·s$^{-1}$·Pa$^{-1}$. The inter-main chain distance calculated as in the preceding Examples was 8.91 angstrom.

In the deodorizing test, the test sample decreased the initial acetaldehyde concentration of 455 ppm to 200 ppm after an irradiation time of 48 hours. The control kept in the dark failed to decrease the acetaldehyde concentration.

Example 7

The MTES hydrolyzate oligomer solution prepared in Example 1 was mixed with demethyldiethoxysilane (DMDE, sold by Shin-Etsu Chemical as LS-1370) at a MTES:DMDE molar ratio of 1:0.2. The mixture was stirred in a closed vessel at room temperature for 30 minutes. After adding 1.2 moles/DMDE of water, the mixture was stirred again under the same condition for 5 hours to obtain a clear solution.

100 g of this solution was mixed with 4 g of the microcapsulated $TiO_2$ photocatalyst prepared in Example 5 to obtain a coating solution. The resulting coating solution was sprayed on a glass substrate and dried at 160° C. to form a coating film of a thickness of about 13 μm and containing 2.5 wt. % of the photocatalyst as $TiO_2$. The oxygen permeability determined on the corresponding self-sustained film of about 50 μm thickness free from the photocatalyst was $2.2 \times 10^{-14}$ mol·m·m$^{-2}$·s$^{-1}$·Pa$^{-1}$. The inter-main chain distance calculated as in the preceding Examples was about 8.88 angstrom.

The resulting coating film formed on the substrate was tested for the deodorizing performance as in the preceding Examples. The test sample decreased the initial acetaldehyde concentration of 460 ppm to 190 ppm after an irradiation time of 48 hours. The control kept in the dark failed to decrease the acetaldehyde concentration.

We claim:

1. A photochemical reactor element comprising a shaped composition containing microcapsulated $TiO_2$ photocatalyst particles having a porous shell layer of photochemically inert inorganic material, said microcapsulated $TiO_2$ photocatalyst particles being dispersed in a polysiloxane matrix having a permeability to oxygen gas not less than $1 \times 10^{-14}$ mol·m·m$^{-2}$·s$^{-1}$·Pa$^{-1}$.

2. The photochemical reactor element according to claim 1 wherein said polysiloxane matrix is composed of a recurring unit of the formula: $RnSiO_{(4-n)/2}$ wherein R is methyl, ethyl, n-propyl, isopropyl, phenyl or vinyl, and n is a number represented by the equation $0 < n \leq 1.7$.

3. The photochemical reactor element according to claim 2 wherein the number n of said formula: $RnSiO_{(4-n)/2}$ is from 0.2 to 1.6.

4. The photochemical reactor element according to claim 2 wherein said polysiloxane matrix is a hydrolyzate-polycondensate of a trialkoxysilane of the formula $RSi(OR')_3$, a mixture thereof with a tetraalkoxysilane of the formula: $Si(OR')_4$ and/or a dialkoxysilane of the formula $R_2Si(OR')_2$ wherein R is as defined, and R' is methyl or ethyl.

5. The photochemical reactor element according to claim 4 wherein the trialkoxysilane is a methyltrimethoxysilane, a methyltriethoxysilane, a ethyltrimethoxysilane, a n-propyltrimethoxysilane, a isopropyltrimethoxysilane, a phenyltriethoxysilane, or a vinyltriethoxysilane.

6. The photochemical reactor element according to claim 4 wherein the tetraalkoxysilane is a tetraethoxysilane or a tetramethoxysilane.

7. The photochemical reactor element according to claim 4 wherein the dialkoxysilane is a dimethyldiethoxysilane or a diphenyldimethoxysilane.

8. The photochemical reactor element according to claim 1 wherein said composition contains the microcapsulated $TiO_2$ photocatalyst particles from 0.1 to 15% by weight as $TiO_2$ of the composition.

9. The photochemical reactor element according to claim 8 wherein said composition contains the microcapsulated $TiO_2$ photocatalyst particles from 0.5 to 10% by weight as $TiO_2$ of the composition.

10. The photochemical reactor element according to claim 1 wherein said shaped composition is in the form of a self-sustained film, a coating film on a substrate, a bulk body or a fibrous form.

11. The photochemical reactor element according to claim 1 wherein the polysiloxane matrix has a permeability to oxygen gas not less than $2 \times 10^{-14}$ mol·m·m$^{-2}$·s$^{-1}$·Pa$^{-1}$.

12. A method of photochemically destroying a maldorous substance, an air-pollutant or a microorganism comprising contacting the maldorous substance, the air-pollutant or the microorganism in the presence of water and oxygen with the photochemical reactor element according to claim 1.

13. A method for preparing a photochemical reactor element comprising:

providing microcapsulated $TiO_2$ photocatalyst particles having a porous shell layer of a photochemically inert inorganic material;

providing a hydrolyzate-polycondensate sol of a trialkoxysilane of the formula $RSi(OR')_3$ wherein R is methyl, ethyl, n-propyl, isopropyl, phenyl or vinyl, and R' is methyl or ethyl, or a mixture of said trialkoxysilane with a tetraalkoxysilane of the formula $Si(OR')_4$ and/or a dialkoxysilane of the formula $R_2Si(OR')_2$ wherein R and R' are as defined;

dispersing an amount of said microcapsulated $TiO_2$ photocataylst particles in said sol; and shaping the dispersion into the photoreactor element comprising a polysiloxane matrix having a permeability to oxygen gas not less than $1 \times 10^{-14}$ mol·m·m$^{-2}$·s$^{-1}$·Pa$^{-1}$.

14. The method according to claim 13 wherein said microcapsulated $TiO_2$ photocatalyst particles are present in an amount from 0.1 to 15% by weight as $TiO_2$ of a shaped composition of the element.

15. The method according to claim 14 wherein said microcapsulated $TiO_2$ photocatalyst particles are present in an amount from 0.5 to 10% by weight as $TiO_2$ of a shaped composition of the element.

16. The method according to claim 13 wherein said hydrolyzate-polycondensate sol is produced in the presence of a catalytically effective amount of a β-diketone metal chelate or a crown ether metal complex.

17. The method for preparing a photochemical reactor element according to claim 13 wherein the polysiloxane matrix has a permeability to oxygen gas not less than $2\times10^{-14}$ mol·m·m$^{-2}$·s$^{-1}$·Pa$^{-1}$.

18. A method for preparing a photochemical reactor element comprising:

providing a hydrolyzate-polycondensate sol of a trialkoxysilane of the formula RSi(OR')$_3$ wherein R is methyl, ethyl, n-propyl, isopropyl, phenyl or vinyl, and R' is methyl or ethyl, or a mixture of said trialkoxysilane with a tetraalkoxysilane of the formula Si(OR')$_4$ and/or a dialkoxysilane of the formula R$_2$Si(OR')$_2$ wherein R and R' are as defined;

dispersing an amount of naked TiO$_2$ photocatalyst particles in said sol;

shaping the dispersion into the photoreactor element comprising a polysiloxane matrix having a permeability to oxygen gas not less than $1\times10^{-14}$ mol·m·m$^{-2}$·s$^{-1}$·Pa$^{-1}$; and irradiating the element with light having an energy greater than the band gap of the TiO$_2$ photocatalyst at a dose sufficient to decompose the hydrocarbon groups attached to the silicon atoms in the vicinity of the TiO$_2$ particles while retaining the polysiloxane network to porously microencapsulate the TiO$_2$ photocatalyst particles.

19. The method according to claim 18 wherein said TiO$_2$ photocatalyst particles are present in an amount from 0.1 to 15% by weight as TiO$_2$ of a shaped composition of the element.

20. The method according to claim 18 wherein said TiO$_2$ photocatalyst particles are present in an amount from 0.5 to 10% by weight as TiO$_2$ of a shaped composition of the element.

21. The method according to claim 18 wherein said hydrolyzate-polycondensate sol is produced in the presence of a catalytically effective amount of a β-diketone metal chelate or a crown ether metal complex.

22. The method for preparing a photochemical reactor element according to claim 18 wherein the polysiloxane matrix has a permeability to oxygen gas not less than $2\times10^{-14}$ mol·m·m$^{-2}$·s$^{-1}$·Pa$^{-1}$.

* * * * *